United States Patent
Lee et al.

(10) Patent No.: US 10,366,498 B2
(45) Date of Patent: Jul. 30, 2019

(54) METHOD AND DEVICE FOR RECOGNIZING MOTION

(71) Applicant: SAMSUNG ELECTRONICS CO., LTD., Suwon-si (KR)

(72) Inventors: Kyoobin Lee, Seoul (KR); Keun Joo Park, Seoul (KR); Kyoungseok Pyun, Seoul (KR); Eric Hyunsurk Ryu, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 428 days.

(21) Appl. No.: 14/986,851

(22) Filed: Jan. 4, 2016

(65) Prior Publication Data

US 2017/0032536 A1  Feb. 2, 2017

(30) Foreign Application Priority Data

Jul. 30, 2015  (KR) .......................... 10-2015-0107962

(51) Int. Cl.
*G06T 7/20* (2017.01)
*H04N 7/18* (2006.01)

(52) U.S. Cl.
CPC .............. *G06T 7/20* (2013.01); *H04N 7/183* (2013.01)

(58) Field of Classification Search
CPC .................................. G06T 7/20; H04N 7/183
USPC ......................................................... 348/155
See application file for complete search history.

(56) References Cited

U.S. PATENT DOCUMENTS

| 5,930,379 A * | 7/1999 | Rehg .................. G06K 9/00342 345/473 |
|---|---|---|
| 2012/0092286 A1 | 4/2012 | O'Prey et al. |
| 2012/0239607 A1 | 9/2012 | Rao et al. |
| 2013/0335595 A1 | 12/2013 | Lee et al. |

FOREIGN PATENT DOCUMENTS

| JP | 4268953 B2 | 5/2009 |
|---|---|---|
| KR | 1020120026956 A | 3/2012 |
| KR | 1020120089948 A | 8/2012 |
| KR | 101265296 B1 | 5/2013 |

OTHER PUBLICATIONS

Chin Poo Lee et al., "Time-sliced averaged motion history image for gait recognition", Jan. 30, 2014, J. Vis. Commun. Image R. 25 (2014), pp. 822-826.

Ling Shao et al., "Spatio-Temporal Laplacian Pyramid Coding for Action Recognition", IEEE Transactions on Cybernetics, vol. 44, No. 6, Jun. 2014, pp. 817-827.

* cited by examiner

*Primary Examiner* — Hee-Yong Kim
(74) *Attorney, Agent, or Firm* — Sughrue Mion, PLLC

(57) ABSTRACT

A method and device for recognizing a motion of an object, the method including receiving event signals from a vision sensor configured to sense the motion, storing, in an event map, first time information indicating a time at which intensity of light corresponding to the event signals changes; generating an image based on second time information corresponding to a predetermined time range among the first time information, and recognizing the motion of the object based on the image.

18 Claims, 5 Drawing Sheets

METHOD AND DEVICE FOR RECOGNIZING MOTION

CROSS-REFERENCE TO RELATED APPLICATION

This application claims priority from Korean Patent Application No. 10-2015-0107962, filed on Jul. 30, 2015 in the Korean Intellectual Property Office, the disclosure of which is incorporated herein by reference in its entirety.

BACKGROUND

1. Field

Methods and devices consistent with exemplary embodiments relate to recognizing a motion.

2. Description of the Related Art

In an image-based method of recognizing a motion based on image data output from a frame-based vision sensor, a motion of an object represented based on a plurality of images is recognized. Each of the images includes static state information of the object such that a large number of images is required for recognizing the motion of the object based on the images. Therefore, in the image-based method of recognizing a motion based on image data output from a frame-based vision sensor, a large amount of operation and time are required according to a high complexity for performing an operation of the plurality of images such that an optimal performance of recognizing the motion may not be guaranteed.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, there is provided method of recognizing a motion of an object, the method including receiving event signals from a vision sensor configured to sense the motion, storing, in an event map, first time information indicating a time at which intensity of light corresponding to the event signals changes, generating an image based on second time information corresponding to a predetermined time range among the first time information, and recognizing the motion of the object based on the image.

The generating the image may include generating a first image including time information corresponding to a first time range among the first time information and generating a second image comprising time information corresponding to a second time range among the first time information, the second time range being different from the first time range.

The recognizing the motion may include determining context information based on the first image and recognizing the motion of the object included in the second image based on the context information.

The first time range may be wider than the second time range.

One end of the first time range and one end of the second time range may correspond to an identical point in time.

The recognizing of the motion of the object may include recognizing the motion of the object from the image based on a neural network.

The event map may include a two-dimensional (2D) map corresponding to the vision sensor and include time information in which most recently generated changes in intensity of light correspond to the event signals.

The event map may include a three-dimensional (3D) map generated by adding a time axis to the 2D map corresponding to the vision sensor and include a time information history.

The vision sensor may include an event-based vision sensor configured to generate at least one event signal in response to an event in which light received from the object is asynchronously changed.

The first time information is information of a time at which the event signals are received from the vision sensor or information of a time at which the event signals are generated by the vision sensor.

According to an aspect of another exemplary embodiment, there is provided a non-transitory computer-readable storage medium storing a program that is executable by a computer to perform the method.

According to an aspect of another exemplary embodiment, there may be provided a device for recognizing a motion of an object, the device including a vision sensor configured to sense the motion and generate at least one event signal based on the sensed motion, and a processor configured to store, in an event map, first time information indicating a time at which intensity of light corresponding to the at least event signal is generated, generate an image based on second time information corresponding to a predetermined time range among the first time information, and recognize the motion of the object based on the image.

The processor may generate a first image including time information corresponding to a first time range among the first time information and generate a second image including time information corresponding to a second time range among the time information. The second time range may be different from the first time range.

The processor may determine context information based on the first image and recognize the motion of the object included in the second image based on the context information.

The first time range may be wider than the second time range.

One end of the first time range and one end of the second time range may correspond to an identical point in time.

The processor may be configured to recognize the motion of the object from the image based on a neural network.

The event map may include a two-dimensional (2D) map corresponding to the vision sensor and comprises time information in which most recently generated changes in intensity of light correspond to the event signals.

The event map may include a three-dimensional (3D) map generated by adding a time axis to the 2D map corresponding to the vision sensor and include a time information history.

The vision sensor may include an event-based vision sensor configured to generate at least one event signal in response to an event in which light received from the object is asynchronously changed.

According to an aspect of another exemplary embodiment, there is provided a method of recognizing a motion of an object, the method including: generating a first image of the object corresponding to a first time period based on an event map including a plurality of map elements, the event map indicating a position of at least one of the plurality of map elements at which change of light intensity occurs and indicating, a time at which the change of light intensity occurs, in association with the position of the at least one of the plurality of map elements; obtaining context information from the first image; generating a second image of the object corresponding to a second time period based on the event map; the second time period being subsequent to the first time period and partially overlapped with the first time period; and determining the motion of the object in the second image based on the context information.

BRIEF DESCRIPTION OF THE DRAWINGS

The above and other aspects of exemplary embodiments will be more apparent by describing certain exemplary embodiments, with reference to the accompanying drawings, in which.

DETAILED DESCRIPTION

Figure 1:
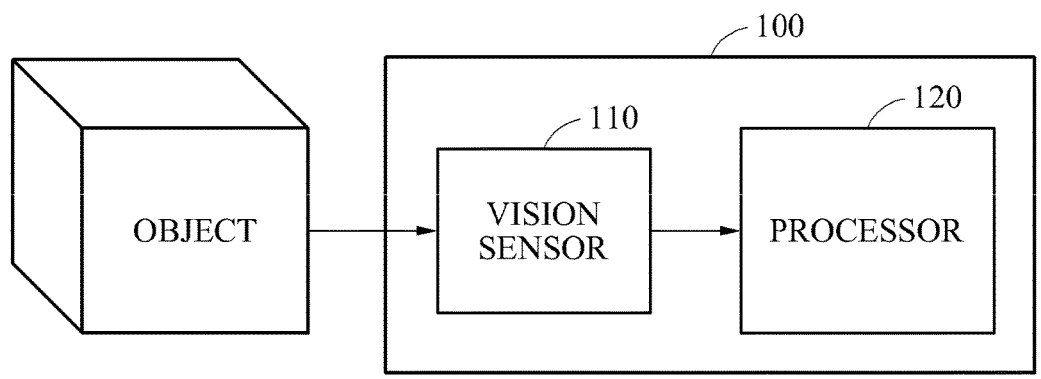
FIG. 1 is a diagram illustrating a device for recognizing a motion according to example embodiments.

Hereinafter, exemplary embodiments will be described in detail with reference to the accompanying drawings.

In the following description, like drawing reference numerals are used for like elements, even in different drawings. Various alterations and modifications may be made to the exemplary embodiments, some of which will be illustrated in detail in the drawings and detailed description. The matters defined in the description, such as detailed construction and elements, are provided to assist in a comprehensive understanding of the exemplary embodiments. However, it should be understood that these embodiments are not construed as limited to the illustrated forms and include all changes, equivalents or alternatives within the idea and the technical scope of this disclosure. It is apparent that the exemplary embodiments can be practiced without those specifically defined matters. Also, well-known functions or constructions are not described in detail since they would obscure the description with unnecessary detail.

FIG. 1 is a diagram illustrating a device for recognizing a motion according to example embodiments.

Referring to FIG. 1, a device for recognizing a motion 100, hereinafter referred to as a motion recognizing device 100, includes a vision sensor 110 and a processor 120. For example, the motion recognizing device 100 may be widely used in an area of image recognition, body motion recognition, security image monitoring, or medical image analyzing. The motion recognizing device 100 may be included in various systems and/or devices, for example, smart phones, tablet computers, laptop computers, desktop computers, televisions, wearable devices, security systems, and smart home systems.

The vision sensor 110 refers to a device that may generate at least one event signal by sensing at least a portion of an object in which a motion occurs and includes, for example, an event-based vision sensor such as a dynamic vision sensor (DVS). The vision sensor 110 includes a plurality of sensing elements (e.g., pixels). A sensing element may output an event signal by sensing a generation of a predetermined event. For example, the vision sensor 110 may include an array of pixels. Each pixel may sense local light and generate an asynchronous address event when light changes by a predetermined relative amount. The address event may include an x-axis pixel coordinate, a y-axis coordinate, a sign of brightness change, and a time stamp.

For example, when the vision sensor 110 senses an event in which intensity of light increases in a predetermined sensing element, the predetermined sensing element may output an ON event signal. Also, when the vision sensor 110 senses an event in which the intensity of light decreases in the predetermined sensing element, the predetermined sensing element may output an OFF event signal.

The vision sensor 110 may output an event signal from a sensing element in which changes in the intensity of light are detected unlike a frame-based vision sensor (e.g., a complementary metal-oxide-semiconductor (CMOS) image sensor (CIS)) may scan an output from each sensing element on a frame-by-frame basis.

An event of changing the intensity of light received to the vision sensor 110 may be generated based on a motion of an object. For example, in practice, when a light source is set by a lapse of time, and when the object does not independently emit light, the light received to the vision sensor 110 may be generated from the light source and reflected by the object. When the object, the light source, and the vision sensor 110 are static, the light reflected by the object in a stationary state may be maintained, in practice. Thus, the intensity of light may not change and vision sensor 110 may not sense the event of changing a light intensity. Conversely, when the object is moving, the light reflected by the moving object may be changed based on the motion of the object. Thus, brightness of the light may change, and the vision sensor 110 may sense the changed brightness. In this example, the motion of the object may include a relative motion between the vision sensor 110 and the object occurring due to the motion of the vision sensor 110 as well as a self-motion of the object.

The event signal output in response to the motion of the object may include information generated in a non-synchronous manner. In this example, the information may be similar to an optic nerve signal transferred from a retina to a brain. For example, the event signal may not be generated with respect to a stationary object, and may be generated in response to sensing a moving object.

As an example, when an intensity of light increases by at least a predetermined amount in a third sensing element, the vision sensor 110 may output a bit indicating an ON event signal and an address of the third sensing element. As another example, when an intensity of light decreases by at least a predetermined amount in a fourth sensing element, the vision sensor 110 may output a bit indicating an OFF event signal and an address of the fourth sensing element. In this example, an address for each sensing element may be expressed by, for example, a number, a position, and an index.

In an example, the vision sensor 110 may not output information of time at which the changes in the intensity of light are generated. In this example, the processor 120 that processes a signal output from the vision sensor 110 may set a point in time at which an event signal is received from the vision sensor 110, as the time at which the changes in the intensity of light are generated. In another example, the vision sensor 110 may output information of the time at which the changes in the intensity of light are generated. In this example, the vision sensor 110 may include a timer. The processor 120 may also receive the information of the time at which the changes in the intensity of light are generated. Hereinafter, for brevity and conciseness, descriptions will be provided based on an example in which the vision sensor 110 sets the point in time at which the processor 120 receives the event signal, as the time at which the changes in the intensity of light are generated, in lieu of outputting the time at which the changes in the intensity of light are generated.

Since the vision sensor 110 uses the address of the sensing element from which the event of changing the intensity of light is sensed or address/time information on the sensing element, a quantity of processed information may be reduced when compared to the frame-based vision sensor. For example, a reaction velocity of an event-based image sensor may be based on a unit less than or equal to a microsecond (µs).

The processor 120 receives event signals from the vision sensor 110 and stores, in an event map, time information in which the changes in intensity of light corresponding to the received event signal are generated. The processor 120 may store, in an event map, time information in which changes in intensity of light corresponding to a received predetermined event signal, and store the time information in a map element corresponding to the received predetermined event signal among a plurality of map elements included in the event map. In this example, the plurality of map elements included in the event map may correspond to a plurality of sensing elements included in the vision sensor 110, respectively.

In an example, the processor 120 may store, in the event map, time information in which most recently generated changes in intensity of light correspond to the event signals. In this example, the event map may include a two-dimensional (2D) map corresponding to the vision sensor 110. Accordingly, each of the plurality of map elements included in the event map may include time information in which most recently generated changes in intensity of light correspond to an event signal of a relevant map element.

In another example, the processor 120 includes a time information history indicating the changes in intensity of light corresponding to the event signals. In this example, the event map may include a 3D map generated by adding a time axis to the 2D map corresponding to the vision sensor 110. Therefore, when event signals corresponding to an identical map element are received at different times, the event map may include the time information on most recently received event signals among the event signals, as well as time information on previously received event signals.

The event map may include the time information indicating the changes in intensity of light corresponding to the event signals. For example, the time information indicating the changes in intensity of light may correspond to information of time at which the event signals are received from the vision sensor 110 or information of time at which the event signals are generated in the vision sensor 110. When the time information corresponds to the information of the time at which the event signals are generated in the vision sensor 110, a timer that outputs the time information may be included in the vision sensor 110.

The processor 120 generates an image based on time information corresponding to a predetermined time range among the time information stored in the event map. The processor 120 may extract time information included in the predetermined time range among the time information stored in the event map. The processor 120 may generate an image including the extracted time information.

For example, the time range may be set as a range from a predetermined point in time in the past to a present point in time. Also, the time range may be set as a range from a first predetermined point in time to a second predetermined point in time. In this example, the first predetermined point in time and the second predetermined point in time may be points in time prior to a present point in time, or the first predetermined point in time may be a point in time prior to the second predetermined point in time. Alternatively, the time range may be variously changed based on a design. Hereinafter, for brevity and conciseness, descriptions will be provided based on an example in which the time range is set as a range from a predetermined point in time in the past to a present point in time.

The processor 120 generates a plurality of images including time information corresponding to different time ranges. The processor 120 generates a first image including time information corresponding to a first time range among the time information stored in the event map and generates a second image including time information corresponding to a second time range among the time information stored in the event map. In this example, the first time range is wider than the second time range and one end of the first time range and one end of the second time range correspond to an identical point in time. A number of images generated from the event map may be greater than or equal to three and the number of images is not limited to the aforementioned descriptions.

Examples in which the processor 120 stores time information in an event map and generates an image from the event map will be described in detail with reference to FIGS. 2 through 7.

The processor 120 recognizes the motion of the object based on the image. The processor 120 recognizes the motion of the object from the image based on a neural network. In this example, the neural network refers to a recognition model implemented by a software or a hardware to imitate a calculation ability of a biological system using a great number of artificial neurons connected by connection lines.

For example, the processor 120 may recognize the motion of the object from the image based on an artificial neural network such as a convolutional neural network (CNN). Alternatively, the processor 120 may recognize the motion of the object from the image based on various machine learning schemes such as a support vector machine (SVM) and a multiplayer perception (MLP).

When a plurality of images, for example, the first image and the second image, including time information corresponding to the different time ranges, for example, the first time range and the second time range, are generated, the processor 120 may recognize the motion of the object from the first image and the second image based on the neural network. The processor 120 determines context information for the motion of the object from the first image including time information included in the first time range. In this example, the first time range is wider than the second time range. The processor 120 may determine the context information for the motion of the object based on the first image including time information in a wide time range.

The processor 120 recognizes the motion of the object included in the second image based on the context information for the motion of the object. The processor 120 may recognize the motion of the object occurring at a point in time at which the motion of the object is to be recognized using the second image including time information in a relatively narrow time range.

In an example, the processor 120 may recognize the motion of the user according to the context information determined based on the first image even when a motion of which the user makes a V shape with her/his finger is recognized based on the second image. When a rock-paper-scissors game played by the user is determined to be the context information based on the first image, the processor 120 may determine the finger in V shape recognized based on the second image, as scissors. Alternatively, when the user posing for a photograph is determined to be the context information based on the first image, the processor 120 may determine the finger in a V shape recognized based on the second image, as a command to a camera.

In another example, the processor 120 may recognize the motion of the user according to the context information determined based on the second image even when a motion of the user swinging an arm from a right side to a left side is recognized based on the second image. When the user playing tennis is determined to be the context information based on the first image, the processor 120 may determine the motion recognized based on the second image, as a motion of swinging a tennis racket. Alternatively, when the user playing a video game is determined to be the context information based on the first image, the processor 120 may determine the motion recognized based on the second image, as an input commander to the video game.

In still another example, the processor 120 may determine an emergency situation to be the context information based on motions of which people are rapidly moving in an identical direction included in the first image. In this example, the processor 120 may recognize, based on the second image, a motion of which a person among the people is falling. The processor 120 may recognize a person who has fallen as a person in need of assistance.

Figure 2:
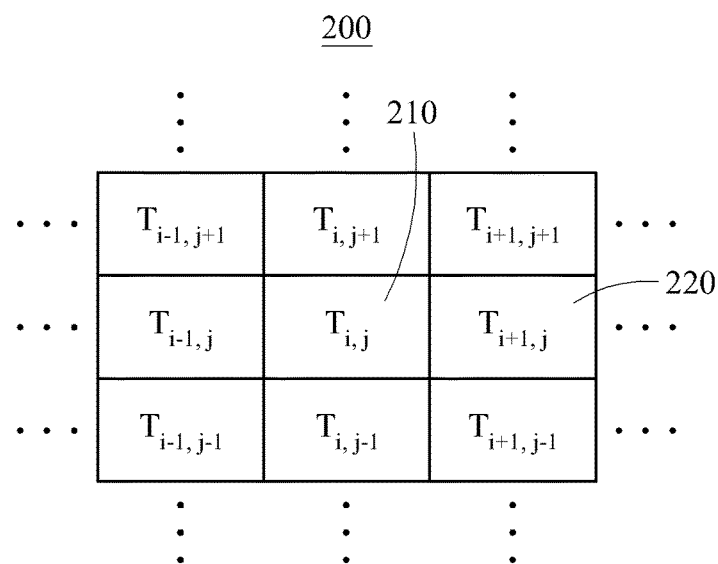
FIG. 2 is a diagram illustrating a process of storing time information of event signals according to example embodiments.

FIG. 2 is a diagram illustrating a process of storing time information of event signals according to example embodiments.

Referring to FIG. 2, when event signals are received, the processor 120 illustrated in FIG. 1 stores, in an event map 200, information of time at which intensity of light corresponding to the event signals changes. The event map 200 may include a plurality of map elements to store time information on a plurality of event signals. Each of the map elements may store time information on an event signal corresponding to a relevant map element. For example, time information $T_{i,j}$ may indicate a change in intensity of light corresponding to an event signal in a map element 210 at a position (i, j), and time information $T_{i+1,j}$ may indicate a change in intensity of light corresponding to an event signal in a map element 220 at a position (i+1, j).

When an event signal is received, the processor 120 updates a map element corresponding to a relevant event signal. The processor 120 may update a map element corresponding to the received signal, in lieu of updating all map elements. For example, the processor 120 may detect the map element corresponding to the received event signal among the plurality of map elements included in the event map 200 and update the detected map element as time information on the received event signal.

In this example, time information in which changes in intensity of light corresponding to event signals are generated may be time information in which the event signals are received from a vision sensor or time information in which the event signals are generated in the vision sensor. For example, the time information in which the changes in intensity of light corresponding to the event signals are generated refers to a time stamp.

Figure 3:
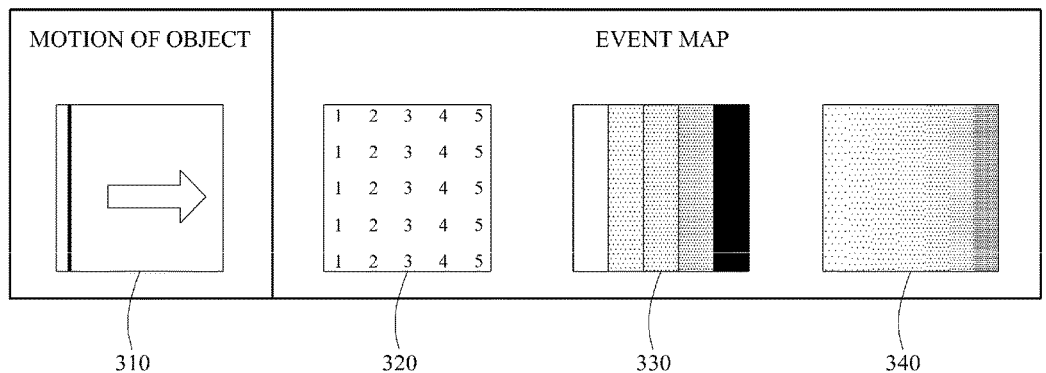
FIG. 3 is a diagram illustrating an example of storing time information in an event map according to example embodiments.

FIG. 3 is a diagram illustrating an example of storing time information in an event map according to example embodiments.

In FIG. 3, a motion 310 of an object that moves from right to left is illustrated.

In an example, an event map 320 includes a time at which changes in intensity of light corresponding to received event information are generated, as time information and includes map elements in a 5×5 arrangement. For example, map elements at a position (1, n) included in the event map include "1", map elements at a position (2, n) include "2", and map elements at a position (5, n) include "5". In this example, n indicates a constant between 1 through 5.

In another example, an event map 330 includes a result to which a predetermined conversion function is applied at a time at which the changes in intensity of light corresponding to the received event information are generated. For example, a conversion function includes (i) a function to subtract a present time from a time at which changes in intensity of light are generated, (ii) a function to subtract the time at which the changes in intensity of light are generated from the present time, (iii) a function to add a greater weight as the time at which the changes in an intensity of light are generated becomes closer to the present time, and (iv) a function to convert the time at which the changes in intensity of light are generated into a pixel value in grayscale.

The event map 330 illustrated in FIG. 3 converts the time at which the changes in intensity of light corresponding to the received event information are generated into a pixel value in grayscale and includes the converted pixel value. For example, the event map 330 may represent the time at which the changes in intensity of light are generated as grayscale by converting the time included in the event map 320 into constants within a grayscale range between 0 (black) and 255 (white). As changes in intensity of light are most recently generated, the event map 330 may represent time information in which the most recently generated changes in intensity of light to be closer to black.

In still another example, an event map 340 includes map elements in a 7×7 arrangement. Based on the event map 340 including relatively more map elements, the motion of the object may be represented in a more detailed manner.

In FIG. 3, the event frames 320 through 340 including the map elements in sizes of 5×5 or 7×7 are only examples and not limited thereto. Event frames may include map elements in a predetermined number, for example, 128×128.

Figure 4:
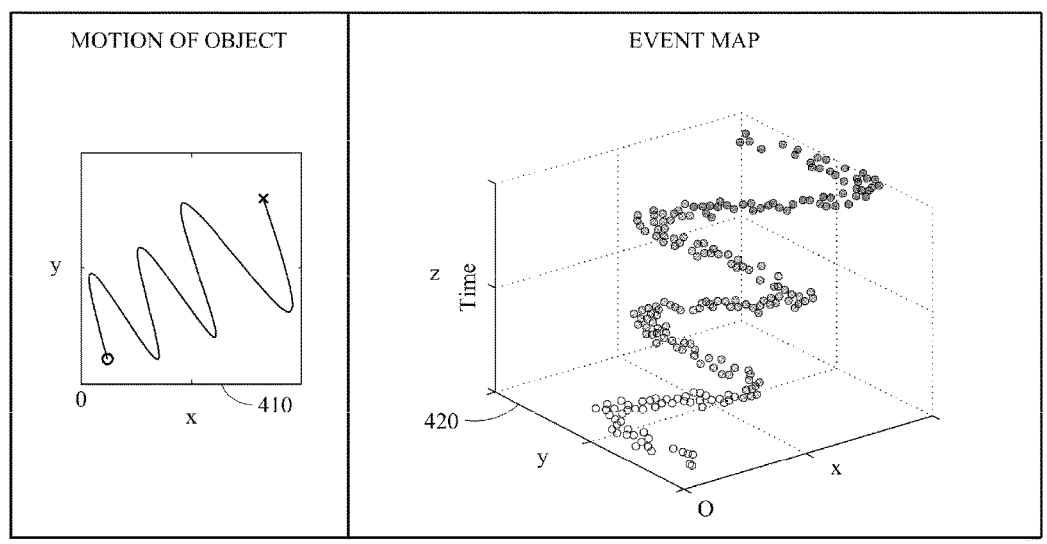
FIG. 4 is a diagram illustrating another example of storing time information in an event map according to example embodiments.

FIG. 4 is a diagram illustrating another example of storing time information in an event map according to example embodiments.

In FIG. 4, a motion 410 of an object that moves from a lower left side to an upper right side in zigzag is illustrated. In the motion 410, a circle indicates a start point of the motion 410, and a cross mark (i.e., x) indicates an end point of the motion 410.

In an example, an event map 420 includes a 3D map by adding a time axis to a 2D map corresponding to a vision sensor. The event map 420 may include time information history in which changes in intensity of light corresponding to event signals are generated by adding the time axis to the 2D map including map elements provided in an x-axis and a y-axis. Events are time-stamped with microsecond resolution and transmitted asynchronously at the time they occur. Each event may be represented as $(x_k, y_k, t_k, p_k)$, where $x_k$ and $y_k$ are pixel coordinates of the event and $t_k$ is its time-stamp. The parameter $p_k$ has a value of +1 or −1 and indicates the change of brightness (i.e., polarity).

The event map 420 includes time information in which most recently generated changes in intensity of light corresponds to event signals in addition to time information in which changes in intensity of light are previously generated, even when the event signals corresponding to an identical map element are received at different times. The event map 420 includes time at which the changes in intensity of light are generated or a pixel value in grayscale converted from the time at which the changes in intensity of light are generated. The event map 420 may represent time at which the changes in intensity of light are generated as grayscale. The event map 420 may represent time information in which the most recently generated changes in intensity of light to be closer to black. When the range of intensity values is set from 0 (black) to 255 (white), the more recent the time information is generated, the closer the intensity value is to 0. The time information represented in the event map 420 may be positioned to be adjacent to each other without a discontinuity in an X-axis direction.

Hereinafter, for conciseness, descriptions will be provided based on an example in which an event map includes a 2D map.

Figure 5:
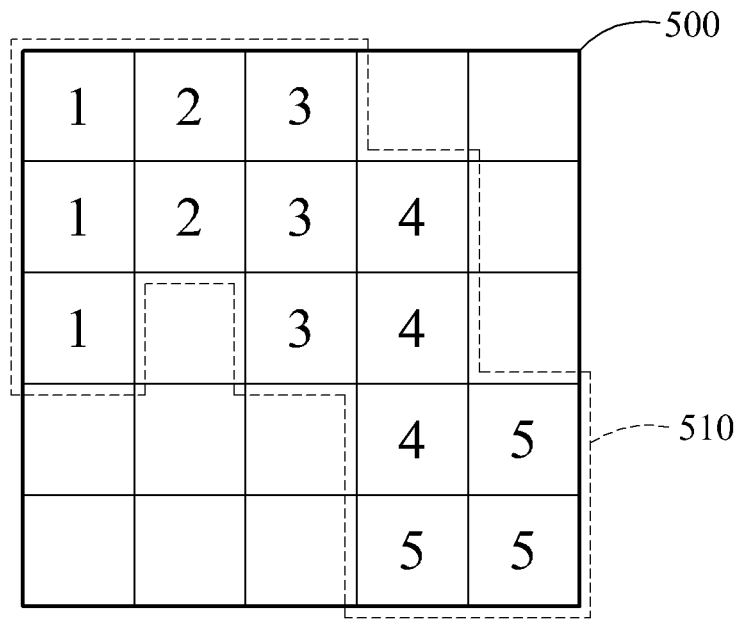
FIGS. 5 through 7 are diagrams illustrating examples of generating an image from an event map according to example embodiments.
Figure 6:
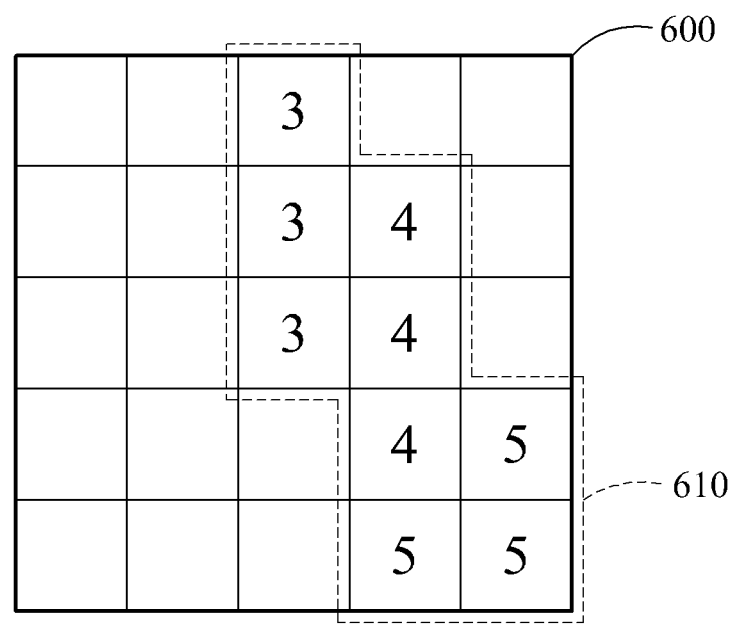
Figure 7:
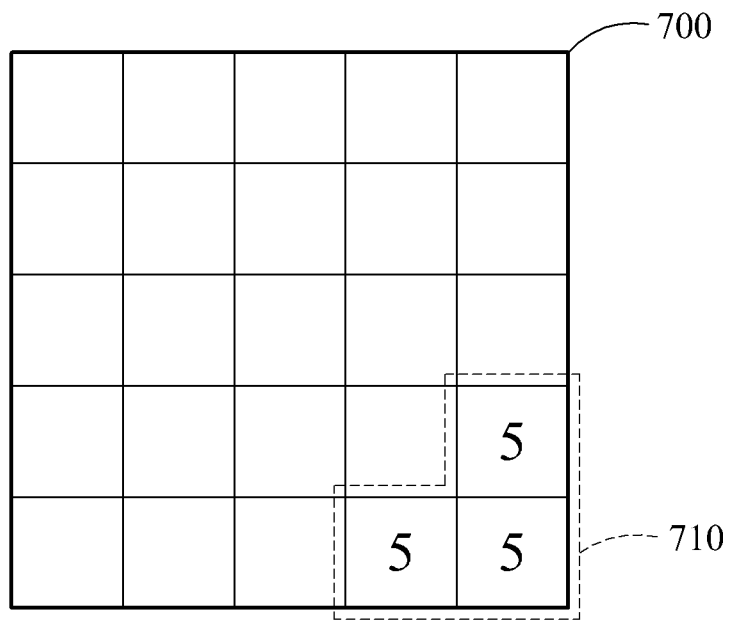

FIGS. 5 through 7 are diagrams illustrating examples of generating an image from an event map according to example embodiments.

Referring to FIG. 5, time information 510 stored in an event map 500 is illustrated. For example, as illustrated in FIG. 5, time information of an event signal corresponding to a map element at a position (1, 2) is "1", and time information of an event signal corresponding to a map element at a position (3, 3) is "3".

A map element not including the time information among map elements included in the event map 500 includes a null value, and the map element may indicate that an event signal corresponding to the map element is not received from a vision sensor.

Referring to FIG. 6, a first image 600 generated from the event map 500 is illustrated. The first image 600 includes time information 610 corresponding to a first time range and the first time range may be set as a range from "3" to "5".

The first image 600 includes the time information 610 extracted to be included in the first time range among the time information 510 included in the event map 500. Time information not included in the first time range among the time information 510 included in the event map 500 may not be included in the first image 600.

Referring to FIG. 7, a second image 700 generated from the event map 500 is illustrated. The second image 700 includes time information 710 corresponding to a second time range, and the second time range may be set as a range corresponding to "5".

The second image 700 includes the time information 710 extracted to be included in the second time range among the time information 510 included in the event map 500. Time information not included in the second time range among the time information 510 included in the event map 500 may not be included in the second image 700.

The processor 120 illustrated in FIG. 1 may determine, based on the first image 600, context information in which an object moves from a center to a lower right side, and recognize, based on the second image 700, an accurate position of the object moving toward a lower right side. The motion of the object is illustrated in FIGS. 6 and 7 for ease of description, a motion recognized based on a plurality of images is not limited thereto. The motion of the object may be recognized based on various forms of context information.

Figure 8:
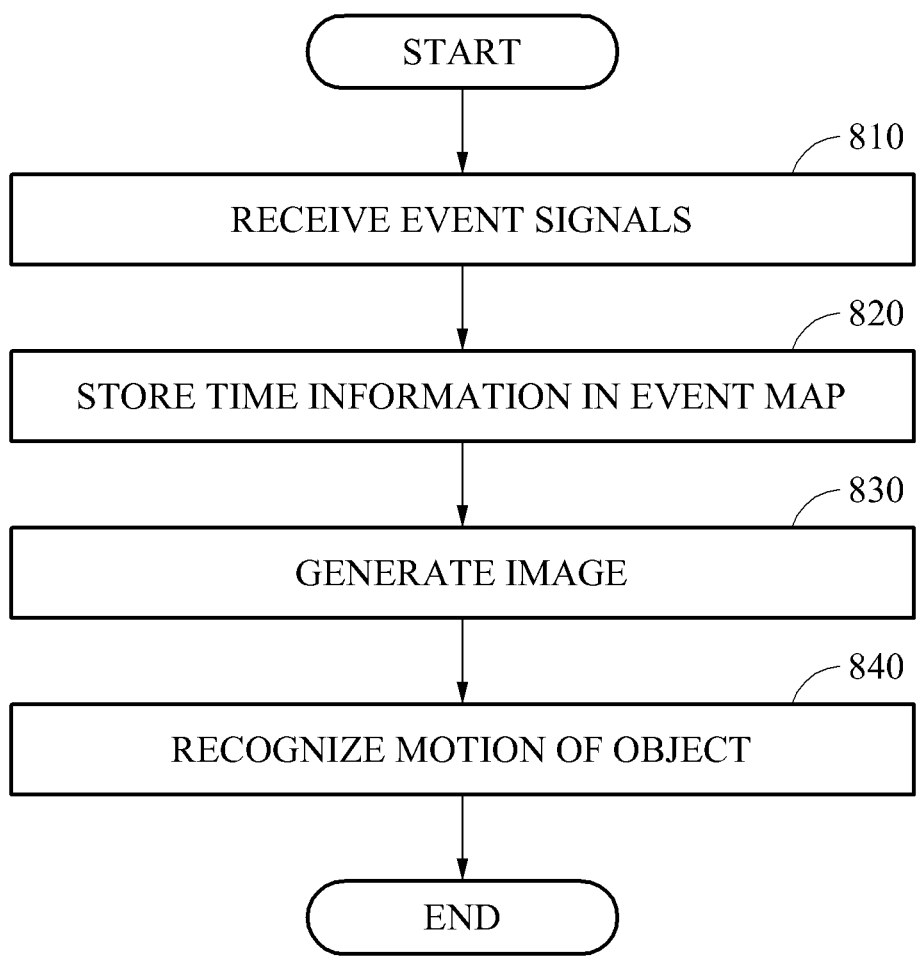
FIG. 8 is a flowchart illustrating a method of recognizing a motion according to example embodiments.

FIG. 8 is a flowchart illustrating a method of recognizing a motion according to example embodiments.

A method of recognizing a motion may be performed by a processor 120 included in a motion recognizing device 100.

In operation 810, the processor 120 may receive event signals from a vision sensor 110 to generate at least one event signal by sensing at least a portion of the object in which the motion occurs.

The vision sensor 110 refers to a device that may generate at least one event signal in response to an event in which light received from the object is asynchronously changed. For example, the vision sensor 110 may include a dynamic vision sensor (DVS). The vision sensor 110 may transmit only the local pixel-level changes caused by movement in a scene, at the time the changes occur, instead of transmitting entire images at fixed frame rates.

In operation 820, the processor 120 may store, in an event map, time information in which changes in intensity of light corresponding to the event signals are generated. In an example, the event map includes a 2D map corresponding to the vision sensor 110, and includes the time information in which most recently generated changes in intensity of light correspond to the event signals. In another example, the event map includes a 3D map by adding a time axis to the 2D map corresponding to the vision sensor 110 and includes a time information history in which the changes in intensity of light corresponding to the event signals are generated.

In this example, the time information in which the changes in intensity of light are generated may be time information in which the event signals are received from the vision sensor or time information in which the event signals are generated in the vision sensor.

In operation 830, the processor 120 may generate an image based on time information corresponding to a predetermined time range among the time information stored in the event map.

In this example, the time range may be specified based on different points in time. Alternatively, the time range may be set as a range from a first predetermined point in time to a second predetermined point in time. Here, the first predetermined point in time and the second predetermined point in time may be points in time prior to a present point in time, or the first predetermined point in time may be a point in time prior to the second predetermined point in time. Alternatively, the time range may be variously changed based on a design.

The processor 120 may generate a plurality of images including time information corresponding to different time ranges. For example, the processor 120 may generate a first image including time information corresponding to a first time range among the time information stored in the event map. The processor 120 may generate a second image including time information corresponding to a second time range among the time information stored in the event map. In this example, the first time range is wider than the second time range, and one end of the first time range and one end of the second time range correspond to an identical point in time.

In operation 840, the processor 120 may recognize a motion of an object based on the image. For example, the processor 120 may recognize the motion of the object from the image based on a neural network. Alternatively, the processor 120 may recognize the motion of the object from the image based on various machine learning schemes such as a CNN and an SVM.

In operation 830, when a plurality of images including time information corresponding to the different time ranges is generated, the processor 120 may recognize the motion of the object based on the plurality of images. For example, when (i) the first image corresponds to the first time range and (ii) the second image corresponds to the second time range having a narrower time range than the first time range are generated, the processor 120 may determine context information for the motion of the object from the first image. The processor 120 may recognize the motion of the object included in the second image based on the context information. The processor 120 may recognize the motion of the object occurring at a point in time at which the motion of the object is to be recognized using the second image including time information in a relatively narrow time range.

Repeated descriptions will be omitted for brevity and conciseness because the descriptions provided with reference to FIGS. 1 through 7 are also applicable to operations illustrated in FIG. 8.

According to an aspect of example embodiments, it is possible to efficiently reduce an amount of operation by recognizing a motion of an object based on an image including time information in which changes in intensity of light corresponding to received event information are generated.

According to another aspect of example embodiments, it is possible to represent a motion of an object represented based on a plurality of frame-based images including a brightness value of the object in a less number of images by representing the motion of the object based on an image including time information in which changes in intensity of light corresponding to received event information are generated and According to still another aspect of example embodiments, it is possible to efficiently enhance a recognition speed with respect to a motion of an object by recognizing the motion of the object based on an image including time information on an event signal in lieu of using an image including a brightness value of the object.

According to a further aspect of example embodiments, it is possible to efficiently enhance recognition accuracy with respect to a motion of an object by recognizing the motion based on context information for the motion of the object based on a plurality of images including time information corresponding to different time ranges.

The exemplary embodiments described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software components may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The above-described exemplary embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the exemplary embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The media may be transfer media such as optical lines, metal lines, or waveguides including a carrier wave for transmitting a signal designating the program command and the data construction. Examples of program instructions include both machine code, such as code produced by a compiler, and files containing higher level code that may be executed by the computer using an interpreter. The described hardware devices may be configured to act as one or more software modules in order to perform the operations of the above-described exemplary embodiments, or vice versa.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of recognizing a motion of an object, the method comprising:
   receiving event signals from a vision sensor configured to sense the motion;
   storing, in an event map, first time information indicating a time at which intensity of light corresponding to the event signals changes;
   generating a map image based on second time information corresponding to a predetermined time range among the first time information, wherein the map image comprises time values that satisfy the predetermined time range, each of the time values being mapped to a respective position in the map image; and recognizing the motion of the object based on the map image, wherein the event map comprises a three-dimensional (3D) map generated by adding a time axis to a two-dimensional (2D) map corresponding to the vision sensor, the 2D map comprising at least one map element represented by an x-axis coordinate and a y-axis coordinate, and the event map further comprises a time information history.

2. The method of claim 1, wherein the generating the map image comprises, generating a first map image comprising time information corresponding to a first time range among the first time information and generating a second map image comprising time information corresponding to a second time range among the first time information, the second time range being different from the first time range.

3. The method of claim 2, wherein the recognizing the motion comprises, determining context information based on the first map image and recognizing the motion of the object in the second map image based on the context information.

4. The method of claim 2, wherein the first time range is wider than the second time range.

5. The method of claim 2, wherein one end of the first time range and one end of the second time range correspond to an identical point in time.

6. The method of claim 1, wherein the recognizing the motion of the object comprises recognizing the motion of the object from the map image based on a neural network.

7. The method of claim 1, wherein the time information history indicates most recently generated changes in intensity of light corresponding to the event signals.

8. The method of claim 1, wherein the vision sensor comprises an event-based vision sensor configured to generate at least one event signal in response to an event in which light received from the object is asynchronously changed.

9. The method of claim 1, wherein the first time information is information of a time at which the event signals are received from the vision sensor or information of a time at which the event signals are generated by the vision sensor.

10. A non-transitory computer-readable storage medium storing a program that is executable by a computer to perform the method of claim 1.

11. A device for recognizing a motion of an object, the device comprising:

a vision sensor configured to sense the motion and generate at least one event signal based on the sensed motion; and a processor configured to:

store, in an event map, first time information indicating a time at which intensity of light corresponding to the at least one event signal is generated, generate a map image based on second time information corresponding to a predetermined time range among the first time information, wherein the map image comprises time values that satisfy the predetermined time range, each of the time values being mapped to a respective position in the map image, and recognize the motion of the object based on the map image, wherein the event map comprises a three-dimensional (3D) map generated by adding a time axis to a two-dimensional (2D) map corresponding to the vision sensor, the 2D map comprising at least one map element represented by an x-axis coordinate and a y-axis coordinate, and the event map further comprises a time information history.

12. The device of claim 11, wherein the processor is configured to generate a first map image comprising time information corresponding to a first time range among the first time information and generate a second map image comprising time information corresponding to a second time range among the time information, the second time range being different from the first time range.

13. The device of claim 12, wherein the processor is configured to determine context information based on the first map image and recognize the motion of the object in the second map image based on the context information.

14. The device of claim 12, wherein the first time range is wider than the second time range.

15. The device of claim 12, wherein one end of the first time range and one end of the second time range correspond to an identical point in time.

16. The device of claim 11, wherein the processor is configured to recognize the motion of the object from the map image based on a neural network.

17. The device of claim 11, wherein the time information history indicates most recently generated changes in intensity of light corresponding to event signals received from the vision sensor.

18. A method of recognizing a motion of an object, the method comprising:

generating a first map image of the object corresponding to a first time period based on an event map including a plurality of map elements, the event map indicating a position of at least one of the plurality of map elements at which change of light intensity occurs and indicating a time, at which the change of light intensity occurs, in association with the position of the at least one of the plurality of map elements;

obtaining context information from the first map image;

generating a second map image of the object corresponding to a second time period based on the event map; the second time period being subsequent to the first time period and partially overlapped with the first time period; and determining the motion of the object in the second map image based on the context information.

* * * * *